No. 874,931. PATENTED DEC. 31, 1907.
G. BRENNER.
MECHANICAL MOVEMENT.
APPLICATION FILED MAY 23, 1907.
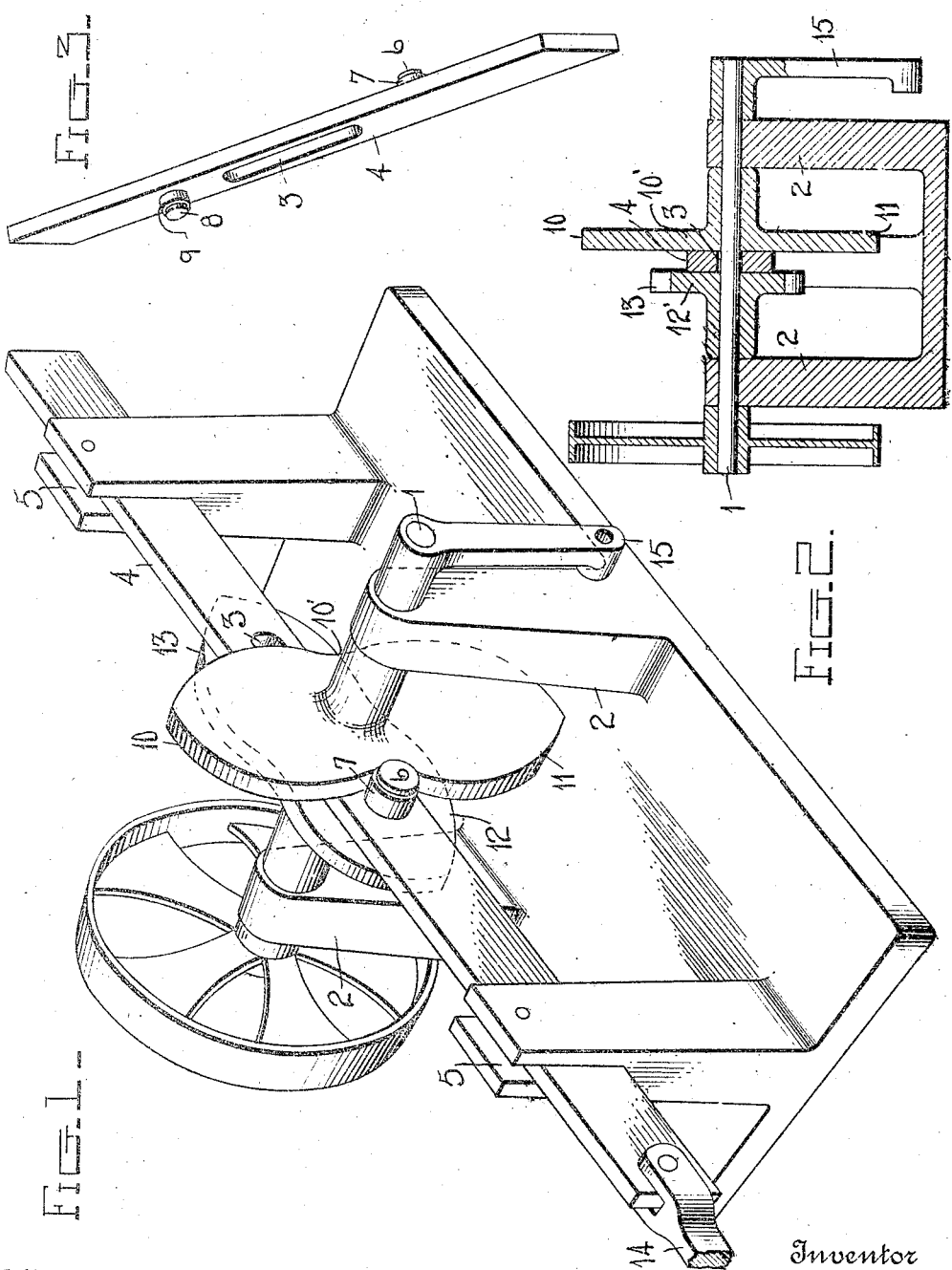
Witnesses
L. B. James
C. H. Giesbauer
Inventor
G. Brenner
by Benj. J. Cowl
Attorney

UNITED STATES PATENT OFFICE.

GODFREY BRENNER, OF POUGHKEEPSIE, NEW YORK.

MECHANICAL MOVEMENT.

No. 874,931.        Specification of Letters Patent.        Patented Dec. 31, 1907.

Application filed May 23, 1907. Serial No. 375,336.

*To all whom it may concern:*

Be it known that I, GODFREY BRENNER, a citizen of the United States, residing at Poughkeepsie, in the county of Dutchess and State of New York, have invented certain new and useful Improvements in Mechanical Movements, of which the following is a specification.

This invention relates to mechanical movements.

The object of the invention is to provide a mechanical movement for converting rotatory motion into a constant reciprocating motion.

In the accompanying drawings, Figure 1 represents a perspective view of the invention; Fig. 2 represents a horizontal sectional view; and Fig. 3 represents a detail perspective view of the reciprocating head or plate.

Referring more particularly to the drawings, a drive shaft 1 is journaled in suitable bearings 2 and is adapted to project through a slot or elongated opening 3 formed in a head or plate 4 which is slidably mounted in suitable guide-ways 5 arranged in standards on a base plate or supporting frame as shown.

On one side of the plate or head 4 is secured a laterally-projecting stud 6 on which a roller 7 is mounted. On the opposite side of the reciprocating member 4 is a stud 8 similar to stud 6 and having a roller 9 mounted thereon. The rollers 7 and 9 of the studs 6 and 8 are disposed within short distances of the adjacent opposite ends of the slot 3.

Fixedly mounted on the shaft 1 adjacent to one side of the head or plate 4 are two oppositely-disposed heart-shaped cams or eccentrics 10 and 11, forming a cam member 10', the cams of which are adapted to alternately engage with the rollers 7 of the studs 6 as the shaft 1 revolves in one direction or the other. On the shaft 1 adjacent to the opposite side of the plate or head 4 is fixedly mounted a pair of oppositely-disposed heart-shaped eccentrics or cams 12 and 13, forming another cam member 12' disposed on the shaft 1 at right angles to the cam member 10' on the other side of the plate 4. The ends of the cams 12 and 13 are adapted to be alternately brought into engagement with the roller 9 on the stud 8 when the shaft 1 is revolved.

On one or both ends of the plate or head 4 are secured connecting rods or links 14 by means of which said head or plate 4 is connected to the mechanism to be driven. Any suitable motive power may be applied to drive the shaft 1 in the desired direction, thereby revolving the cams thereon, said cams being engaged with the rollers 7 and 9 on the opposite side of the plate 4 will reciprocate said plate back and forth in the guide-ways 5, thus transforming the rotatory motion of the shaft into a constant or continuous reciprocating motion which is imparted through the connecting rod 14 to the mechanism or machine to be operated.

By arranging the heart-shaped cams as herein shown and described, the cams on one side or the other of the plate will be always in engagement with one or the other of the rollers 7 or 9, thus providing for the taking up of lost motion and imparting a steady even movement to the reciprocating member 4. In this embodiment of the invention, a crank arm 15 is shown to provide for the use of another shaft and pulley if desired to cause the piston or plate 4 to work more smoothly.

From the foregoing description taken in connection with the accompanying drawings, the construction and operation of the invention will be readily understood without requiring a more extended explanation.

I claim as my invention:—

1. In a mechanical movement, the combination of a supporting frame, a reciprocating member mounted thereon, a rotary shaft journaled on said frame, and two spaced cam members secured to said shaft at different angles to each other and arranged to engage and reciprocate said reciprocating member, said cam members being each composed of oppositely disposed heart-shaped cams.

2. In an apparatus of the class described, the combination of a supporting frame, a reciprocating member mounted thereon, a rotary shaft journaled on said frame and extending transversely relatively to said reciprocating member, two cam members fixed to said shaft on opposite sides of said reciprocating member and each composed of oppositely disposed heart-shaped cams, said cam members being arranged at different angles to each other, and means on opposite sides of said reciprocating member arranged to be engaged by said cams and impart a constant reciprocating motion to said member.

3. In a mechanical movement comprising a suitably driven shaft, a reciprocating member, a pair of cam members composed of oppositely disposed heart-shaped cams and mounted on said shaft on either side of said reciprocating member, and means carried by said member on opposite sides thereof with which said cams engage to impart a constant reciprocating movement thereto.

4. In a mechanical movement comprising a suitably driven shaft, a reciprocating member having formed therein a slot through which said shaft projects, oppositely disposed heart-shaped cams spaced from each other and arranged on said shaft adjacent each side of said reciprocating member, and rollers arranged on opposite sides of said member in position to be alternately engaged by the oppositely disposed heart-shaped cams on each side of said member to impart a constant reciprocating motion to the latter.

5. A mechanical movement comprising a suitably driven shaft, a reciprocating member, oppositely projecting heart-shaped cams mounted on said shaft adjacent to one side of said member, similarly disposed cams mounted on said shaft adjacent to the other side of said member, the last-mentioned cams being arranged at right angles to the first-mentioned cams, rollers secured to the opposite sides of the plate and adapted to be alternately engaged by the oppositely projecting cams on each side of said member to impart a reciprocating motion to said member, and a connecting rod secured on said reciprocating member.

6. A mechanical movement comprising a suitably driven shaft, guide-ways arranged on opposite sides of said shaft, a reciprocating plate adapted to slide in said guide-ways, said plate having formed therein a longitudinally disposed slot through which said shaft is adapted to project, oppositely-projecting heart-shaped cams mounted on said shaft adjacent to one side of said plate, similarly disposed cams mounted on said shaft adjacent to the other side of said plate, the last mentioned cams being arranged at right angles to the first-mentioned cams, rollers secured to the opposite sides of the plate and adapted to be alternately engaged by the oppositely-projecting cams on each side of said plate to impart a reciprocating motion to said plate and a connecting rod secured to said plate.

In testimony whereof I have signed my name to this specification in presence of two witnesses.

GODFREY BRENNER.

Witnesses:
HARRY ARNOLD,
IRVING ELTING.